United States Patent [19]

Almond et al.

[11] Patent Number: 4,552,215

[45] Date of Patent: Nov. 12, 1985

[54] METHOD OF GRAVEL PACKING A WELL

[75] Inventors: Stephen W. Almond, Ventura, Calif.; Ronald E. Himes, Rush Springs, Okla.

[73] Assignee: Halliburton Company, Duncan, Okla.

[21] Appl. No.: 654,818

[22] Filed: Sep. 26, 1984

[51] Int. Cl.$^4$ .............................................. E21B 43/04
[52] U.S. Cl. ............................... 166/278; 252/8.55 R
[58] Field of Search ............................. 166/278, 276; 252/8.55 R

[56] References Cited

U.S. PATENT DOCUMENTS

| | | | |
|---|---|---|---|
| 3,498,380 | 3/1970 | Sparlin et al. | 166/278 |
| 3,868,998 | 3/1975 | Lybarger et al. | 166/278 |
| 4,174,283 | 11/1979 | Griffin, Jr. | 166/308 X |
| 4,220,566 | 9/1980 | Constien et al. | 166/276 X |
| 4,466,890 | 8/1984 | Briscoe | 252/8.55 R |

OTHER PUBLICATIONS

Shryock, Steven G., "Gravel-Packing Studies in a Full-Scale Deviated Model Wellbore", *Journal of Petroleum Technology*, Mar. 1983, pp. 603-608.

*Primary Examiner*—George A. Suchfield
*Attorney, Agent, or Firm*—Robert A. Kent; Thomas R. Weaver

[57] ABSTRACT

The present invention relates to a thermally stable crosslinked gel gravel packing fluid for use in the treatment of highly deviated well bores penetrating a subterranean formation. The gravel packing fluid comprises an aqueous liquid, a gelling agent comprising a selected modified cellulose ether, a crosslinking agent, a breaker, a particulate agent and any additional additives that may be present.

20 Claims, No Drawings

METHOD OF GRAVEL PACKING A WELL

BACKGROUND OF THE INVENTION

The present invention relates to a method and composition for gravel packing of well bores penetrating subterranean formations and particularly for gravel packing highly deviated well bores.

Unconsolidated formations, particularly those containing loose sands and soft sandstone strata, present constant problems in well production due to migration of loose sands and degraded sandstone into the well bore as the formation deteriorates under the pressure and flow of fluids therethrough. This migration of particles may eventually clog the flow passages in the production system of the well, and can seriously erode the equipment. In some instances, the clogging of the production system may lead to a complete cessation of flow, or "killing" of the well.

One method of controlling sand migration into a well bore consists of placing a pack of gravel on the exterior of a perforated or slotted liner or screen which is positioned across an unconsolidated formation to present a barrier to the migrating sand from that formation while still permitting fluid flow. The gravel is carried to the formation in the form of a slurry, the carrier fluid being removed and returned to the surface. The proper size of gravel must be employed to effectively halt sand migration through the pack, the apertures of the liner or screen being gauged so that the gravel will settle out on its exterior, with the slurry fluid carrying the gravel entering the liner or screen from its exterior.

Prior to effecting the gravel pack, drilling mud and other contaminants may be washed from the well bore, and the formation treated. Commonly employed treatments include acidizing to dissolve formation clays, and injecting stabilizing agents to prevent migration of formation components.

While numerous methods are available for effecting gravel packs in substantially vertical well bores, such methods often are unsatisfactory in effecting gravel packing of highly deviated well bores. Conventional gravel packing fluids utilizing uncrosslinked hydroxyethylcellulose, hydroxypropylguar, xanthan gum and the like as the viscosifier allows or permit the gravel to fall or settle to the low side of the tubing in long highly deviated wells. Such settling can result in a premature "sand-out" caused by a bridging of the settled particles across the tubing. Mechanical devices such as a baffled washpipe and oversized washpipes have been used to attempt to prevent or minimize the premature settling of the gravel. Such devices have experienced only limited success in solving the problem.

An ideal fluid for gravel packing operations would be one that shows little or no settling of gravel so that a high concentration of gravel can be transported through the tubing at any angle. The fluid also should exhibit adequate fluid loss to insure compact packing of the gravel against the formation face. The fluid also should "break" to a reduced viscosity fluid similar to the viscosity of water over a predesigned time interval and deposit no residual solids so as to avoid or minimize any formation damage.

Gravel packing of wells which are highly deviated necessitate the use of a viscosified fluid which is capable of providing an infinite gravel fall rate, that is, a zero rate of gravel settling in the fluid during placement in the well bore. A gravel packing fluid having a zero gravel fall rate would assure that the gravel being carried to the production zone in a highly deviated well bore would not prematurely settle-out.

One method employed to substantially achieve a zero gravel fall rate with a polymeric gravel packing fluid is to crosslink the polymer. An aqueous solution of a crosslinked polymer provides a gel structure which suspends the gravel particles causing substantially a zero fall rate. Polymers which typically have been utilized are hydroxypropylguar and carboxymethylhydroxyethylcellulose because of their ease of crosslinking with metal ions such as titanium (IV) and aluminum (III). The main objections to using such fluids for gravel packing operations are the limited control of fluid loss to the formation and the excessive amount of formation damage which can result from use of the fluids.

The present invention provides a solution for, or at least mitigates, the above-discussed problems. The present invention provides improved methods for gravel packing well bores penetrating subterranean formations utilizing a novel crosslinked gelling agent.

SUMMARY OF THE INVENTION

The surprising discovery now has been made that a novel composition including a selected gelling agent prepared by incorporation of a pendent vicinal dihydroxy structure which assumes or is capable of assuming a cis geometry in hydroxyethylcellulose or another selected cellulose ether which is crosslinked by zirconium (IV) metal ions provides gravel packing fluids which exhibit substantially zero gravel fall rate, a suitable fluid loss, controlled break and leave substantially no residue in the subterranean formation.

The gravel packing fluid is introduced into a subterranean formation through a well bore penetrating the formation. The gravel packing fluid is introduced into the formation at a rate and pressure sufficient to deposit the gravel in a uniform pack against the face of the formation. The gravel packing fluid incorporates a breaker to provide controlled fluid viscosity reduction and facilitate fluid recovery.

DESCRIPTION OF THE PREFERRED EMBODIMENT

The present invention provides a method and composition for use in gravel packing well bores penetrating subterranean formations and particularly deviated well bores. The term "deviated well bore" as used herein means a well bore in which any portion of the well is in excess of about 65 degrees from a vertical inclination. The gravel packing fluid composition of the present invention comprises an aqueous liquid, a novel gelling agent, a selected crosslinking agent and a selected breaker. The fluid can carry substantial quantities of gravel into a subterranean formation without premature settling and can be pumped into the formation utilizing pumping equipment and tubular goods normally available at a wellhead.

An aqueous liquid is used to hydrate the novel gelling agent prior to crosslinking. The aqueous liquid must be of a pH which is compatible with the crosslinking agent used to crosslink the hydrated gelling agent. The aqueous liquid generally may have a pH of from about 2.0 to about 11 when contacted with the gelling agent without adversely effecting hydration of the gelling agent or the subsequent properties of the gelled fracturing fluid.

The gelling agent of the present invention comprises a derivatized cellulose ether. While the present invention will be principally described in conjunction with the use of hydroxyethyl cellulose as the cellulose ether, it should be appreciated that other cellulose ethers could be similarly utilized. For example, hydroxypropylcellulose, carboxymethylcellulose, alkyl celluloses such as methyl and ethyl cellulose, mixed ethers, such as, carboxymethylhydroxyethylcellulose and the like can be utilized under appropriate conditions.

The gelling agent of the present invention must be water soluble. As is known, hydroxyethylcelluloses having a molar substitution (MS) of from about 1.5 to about 3.5 or so are water soluble. Regardless of whether the starting material in the formation of the gelling agent is water soluble, it is satisfactory if the resulting product is water soluble. Thus, the present invention may utilize substantially any polysaccharide which is capable of incorporation of the pendent vicinal dihydroxy structure to be described hereafter.

The gelling agent of the present invention comprises a cellulose ether which is chemically modified to incorporate pendent vicinal dihydroxy groups which assume or can assume cis geometry. Hereinafter, to facilitate an understanding of the present invention, specific reference will be made to a cellulose ether comprising hydroxyethylcellulose. The incorporation of the vicinal dihydroxy groups may be achieved by reaction of the hydroxyethylcellulose with purified glycidol, which is a commercially available compound.

Glycidol derivatives or compounds such as 3-chloro-1,2-propanediol (hereinafter "CPD"), which forms glycidol in situ, also may be utilized. The use of a high purity material is desirable to minimize the impurities which can interfere with the desired performance of the resulting product. In addition, other compounds which will provide a pendent vicinal dihydroxy structure, such as, for example, 2,3-epoxy-1,4-butanediol also may be utilized.

Similarly, what will be termed herein "crude glycidol" may be employed to incorporate the desired pendent vicinal dihydroxy structure. To this end, high purity CPD is dissolved in a suitable solvent, such as, for example, ethanol, isopropanol or t-butanol; and the temperature is adjusted to about 65° F. (±4° F.) Sodium hydroxide (50% by weight aqueous solution) is added over a period of about one hour or so with cooling to maintain the temperature at about 65° F. After the addition is complete, the reaction mixture is allowed to stand at ambient conditions for about 40 minutes or so. The reaction mixture is then filtered, and the resulting filtrate may be used without further processing to react with the hydroxyethylcellulose to synthesize the gelling agents of the present invention.

The crude glycidol should be used relatively promptly after preparation, that is, within one or two days or so. Thus relatively prompt use avoids a number of undesirable reactions which otherwise can take place which could result in hydrolysis of the glycidol, polymerization thereof, and the like. Storage of the crude glycidol at low temperatures can prolong the useful life somewhat.

It should be appreciated that the reaction conditions set forth herein to produce the crude glycidol are merely exemplary. What is considered important is that the synthesis take place in essentially an organic media, other than the water associated with the addition of the sodium hydroxide. This insures that the amount of water in the crude glycidol will not be so excessive as to require further processing to reduce the water level to that desired for reaction with the hydroxyethylcellulose. It is also desirable to utilize a caustic level which will insure that essentially no sodium hydroxide will remain after completion of the reaction and to carry out the reaction at essentially ambient temperature conditions.

Still further, the pendent vicinal dihydroxy structure may be incorporated by use of an aromatic polyol wherein at least two hydroxyl groups are located on adjacent carbon atoms. This structure will be essentially equivalent to the vicinal dihydroxy structure on aliphatic alcohols which assumes, or can assume, cis geometry.

The incorporation of the pendent vicinal dihydroxy structure can be carried out by, in general, using the standard slurry techniques known for preparing cellulose ethers. However, care must be taken with the process parameters selected to insure that the resulting end product has the desired characteristics.

The basic procedure involved is summarized in the following series of equations:

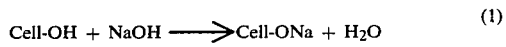

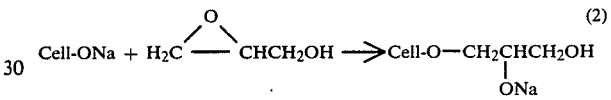

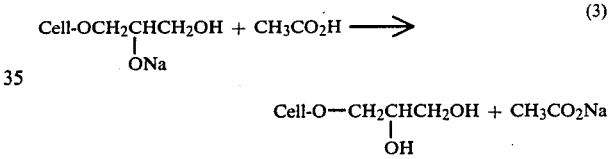

wherein "Cell" represents the cellulosic backbone.

A variety of diluents, such as, for example, alcohols, ketones and the like, and mixtures thereof are known for use in forming cellulose ethers. It is preferred to utilize acetone since polysaccharide products having improved performance characteristics have been provided. Isopropanol and t-butanol also have been found satisfactory.

The ratio of the diluent to the hydroxyethylcellulose may be varied within wide limits. The product obtained does not appear to be particularly sensitive to the ratio employed. It has been found suitable to utilize weight ratios in the range of at least about 4:1 to about 25:1 or greater, and more desirably about 5:1 to about 10:1. The use of relatively high ratios of diluent to hydroxyethylcellulose tend to require longer reaction times to provide products with the requisite characteristics.

A wide variety of alkaline materials are known for use in preparing cellulose ethers and may be employed. It is preferred to utilize sodium hydroxide; however, other useful materials which may be used include, for example, potassium hydroxide and lithium hydroxide. The molar ratio of caustic/hydroxyethylcellulose may suitably vary from about 0.4:1 or lower to 0.8:1 or so, more desirably about 0.5:1 to about 0.8:1. Based upon present data, it is believed that products capable of imparting improved performance are obtained with lower caustic levels. The reaction of glycidol with hydroxyethylcellulose is catalytic so that the sodium hydroxide or other caustic used is not consumed. The amount of caustic utilized must be adequate to causticize the hydroxyethylcellulose, but increased amounts of caustic could result in increased nucleophilic attack of hydroxyl ions on glycidol, resulting in a lowering of the effective amount of glycidol available for reaction.

Cellulosics that are in contact with any base may be readily degraded by oxygen. It is accordingly necessary to exclude oxygen from the reaction vessel during the entire time in which caustic is present. It is suitable to carry out the reaction under a continuous flow of an inert gas such as nitrogen.

It is desirable to provide vigorous stirring so as to provide for more complete reaction and a more homogeneous product. Causticized cellulosics tend to be more gelatinous and viscous than normal cellulosics, and compensation for such should be kept in mind when selecting the stirring apparatus.

The reaction is carried out by adding glycidol over a period of time to a slurry of the hydroxyethylcellulose in acetone or other diluent used which contains water and the caustic. The amount of water employed should be limited to the amount needed to swell the cellulose to allow the reaction to take place since increased amounts tend to provide products having less than optimum characteristics. When acetone is employed as a diluent, the amount of water may vary from about 5 percent to at least 20 percent or more, more desirably about 7 percent to about 13 percent, based upon the total weight of the water and acetone, a level of about 10 percent or so being preferred. When using isopropanol as a diluent, the range of water that may be used is significantly narrower, an amount of about 5 percent by weight water being desirable.

While addition all at once is acceptable, the glycidol is more desirably added over a period of time at the reaction temperature and then allowed to cook-out or react until completion. The conditions during the glycidol addition should be such as to minimize catenation. It is thus more desirable to add the glycidol slowly enough to achieve efficient mixing and to have a relatively homogeneous reaction mixture so as to minimize or eliminate localized areas of relatively high glycidol concentration. The reaction is desirably carried out at a temperature in the range of from ambient conditions or so up to that of reflux conditions for the diluent system being employed. When carrying out the reaction under reflux conditions, it appears that the overall time of reaction involved is more important than the length of addition and completion, although it has been found desirable to provide an addition time of at least about one hour or so. It has been found satisfactory to use total reaction times of about 2 to about 5 hours or so under reflux conditions. The use of lower temperatures will require longer reaction times.

The amount of glycidol utilized should in a functional sense be sufficient to incorporate an adequate number of the pendent vicinal dihydroxy groups to provide, upon crosslinking, a polymer having the desired performance characteristics. Purified glycidol (that is, distilled glycidol) is a relatively expensive component, and no substantial benefits are obtained by using excessive amounts. Weight ratios of glycidol/hydroxyethylcellulose in the range of about 0.15:1 to about 0.65:1 should be suitable. A ratio of about 0.15 or so should provide a degree of substitution (DS) of about 0.3 while a ratio of 0.65:1 should provide a DS of about 1.3, assuming a 50% efficiency of incorporation of the glycidol. It has been found more desirable to utilize glycidol amounts adequate to provide a DS in the range of about 0.5 to about 1.2. A preferred derivative utilizes glycidol amounts adequate to provide a DS in the range of from about 0.7 to about 0.9.

The efficiency can be estimated by mass balance, determined by weight gain of the product corrected for the salt formed from neutralizing the product, such as, for example, sodium acetate when acetic acid is used.

In addition, the pendent vicinal dihydroxy content may be determined by a periodate oxidation as is known (*Quantitative Organic Analysis via Functional Groups*), Siggia and Hanna, Fourth Edition, 1979, John Wiley and Sons, pp.42–43). The trans-1,2-diols in the glucose units of the cellulose backbone should not interfere with the titration of the pendent dihydroxy groups. Accordingly, unlike the theoretical and mass balance MS, which measure the total glycidol incorporation into the polymer, the titrated MS measures only the glycidol incorporated which still retains the vicinal dihydroxy structure. This technique thus discriminates between the glycidol incorporated internally in the pendent chain and the glycidol incorporated at the end of the pendent chain. The titrated MS therefore measures the number of available vicinal dihydroxy crosslinking sites per anhydrogluclose unit, and is more properly considered a measure of the degree of substitution (DS). The DS values set forth herein are accordingly determined by the periodate oxidation test.

The resulting product should be neutralized, as is known, to a slightly acidic pH to provide a product stable in air. Any of a variety of acids may be employed, as is known in conjunction with the preparation of cellulose ethers. The salts which result from the neutralization should be maintained at a minimum.

The product which results may be washed and then dried to isolate the product as a powder. The particular conditions under which these steps are carried out are well known to individuals skilled in the art. As an illustrative example, it is suitable to wash with an acetone/water mixture one or more times, followed by washing, one or more times with acetone. Drying may be accomplished in a vacuum at a temperature of, for example, 122° F.

After washing, if it is desired to provide a product which has slower hydration characteristics, the polysaccharide may be treated with a dialdehyde such as glyoxal. Techniques of this type are known and may be used.

The gelling agent of the present invention is admixed with the aqueous liquid in an amount sufficient to provide a desired viscosity to the gelled fracturing fluid. Generally, the gelling agent should be present in an amount in excess of about 0.2 percent by weight of the aqueous liquid. Preferably, the gelling agent is present in an amount of from about 0.2 to about 3.0 percent by weight of the aqueous fluid. Most preferably, the gelling agent is present in an amount of from about 0.3 to about 1.5 percent by weight of the aqueous liquid. Gelling agent concentrations below about 0.2 percent by weight generally provide insufficient amounts of the gelling agent to provide the crosslinked fluid the desired properties of viscosity and stability.

The hydrated gelling agent is admixed with a crosslinking agent to crosslink the polysaccharide and provide a shear-thermal stable fluid suitable for use in the treatment of subterranean formations. The crosslinking agent can comprise any zirconium (IV) containing compound which is soluble in the hydrated gelling agent solution and capable of forming a crosslinked structure with the gelling agent whereby the viscosity of the fluid is increased at near ambient temperature levels and the gelled fluid exhibits shear-thermal stability at elevated temperatures, of from about 150° F. to in excess of about 275° F.

Compounds which supply zirconium (IV) ions are, for example, zirconium acetylacetonate, zirconium lactate, zirconium carbonate and zirconium diisopropylamine lactate. Various of such compounds are available from companies such as: Kay Fries, Rockleigh, N.J.; Magnesium Electron, Starret, Tex.; Zirconium Technology, Gainsville, Fla. and Magnablend, Inc., DeSoto, Tex.

The crosslinking agent of the present invention generally is present in an amount of at least about 0.001 percent by weight of the aqueous liquid. Preferably, the crosslinking agent is present in an amount sufficient to provide a zirconium (IV) ion concentration of from about 20 to about 50 parts per million (ppm) and, most preferably, from about 35 to about 45 ppm.

The crosslinked gel may have a pH in the range of from about 7 to about 10 and provide the desired properties to the gel.

Any of a variety of conventional particulate agents may be employed with the gravel packing fluid compositions of the present invention such as quartz sand grains, glass beads, synthetic resins, resin coated sand, walnut shell fragments, nylon pellets and similar materials. Such agents are generally used in concentrations between about 1 to about 20 pounds per gallon of the gravel packing fluid composition, but higher or lower concentrations may be used as required. The size of particulate agent employed depends on the particular type of formation and the particle size of formation particulates and the like. Particles having a size in the range of from about 8 to about 70 mesh on the U.S. Sieve Series scale generally may be employed.

If desired, a buffer may be included in the gravel packing fluid to maintain the pH within a range of about 7.5 to about 9. Any buffer system which will maintain the pH of the gravel packing fluid within this range is suitable so long as the buffer does not unduly interfere with the crosslinking reaction. As an example, disodium octaborate tetrahydrate buffer may be employed. Other buffers which also may be used comprise dipotassium octaborate tetrahydrate, sodium diacetate, fumaric acid-sodium bicarbonate or sodium bicarbonate-sodium carbonate.

In addition, so long as the particular materials employed do not adversely interfere with the crosslinking reaction, any of a variety of auxiliary agents used in conventional gravel packing fluids may be included. For example, friction reducers, biocides, surfactants, auxiliary stabilizers, fluid loss agents, and the like are known in the art and may be employed.

Once the gravel packing fluid has been pumped into the subterranean formation and the gravel has been placed, it is desirable to rapidly "break" the crosslinked gel into a fluid having low viscosity so that it can be either pumped or produced from the formation through the well bore. To provide a predictable breaking time within relatively narrow limits, a breaker comprising a mild oxidizing agent is used. Suitable oxidizing agents are ammonium persulfate, sodium persulfate and the like. Preferably, the breaker is present in an amount of from about 0.1 to about 2 pounds per 1,000 gallons of aqueous liquid. At bottom hole temperatures below about 140° F., enzymes are generally used as breakers. Suitable enzymes for such use are alpha and beta amylases, amyloglucosidase, oligoglucosidase, invertase, maltase, cellulase and hemicellulase.

The gravel pack of the present invention may be formed in a variety of ways. Generally, a minor amount of the formation adjacent that section of the well to be treated is removed by washing with hot water as in the case of a tar sand formation or other suitable fluid or by underreaming to form a small cavity in the immediate vicinity of the well bore. After a suitable amount of material has been removed, the tubing string or other well hardware is placed in the well following which the particulate material is introduced into the well bore opposite the permeable formation.

In one method of introducing the particulate into the well, a crosslinked gelled slurry containing the particulate agent is formed and pumped into the well bore. Generally, the thus-formed slurry is pumped down the annulus between the well tubing and the well casing, through the bottom of the annulus and then through perforations such as slots or other openings in the closed-end tubing which extends below the casing to a location opposite the permeable zone. The perforations in the tubing are selected so that the particulate material is filtered from the slurry as it enters the tubing from which the carrier liquid is removed to the surface by pumping. Simultaneously, the slurry is forced into the formation and the particulate material contained is filtered out against the formation face. The remaining gravel packing fluid in the well bore, upon placement of the desired quantity of gravel, is permitted to break to a low viscosity fluid. The particulate agent remaining suspended in the fluid now separates and settles to form a pack having a minimum of void spaces. Normally, once the gravel packing fluid has broken, pumping of the fluid is resumed in the well bore to further compact or settle the gravel pack to further minimize void spaces that may be present. The granular or particulate materials thus removed from the slurry form a pack consisting essentially of particulate which is tightly packed together to form a permeable sand control pack.

In another method, the casing which extends through the permeable production zone is perforated near the top and again near the bottom of the producing zone after which a tubing string equipped with a back-off connection so that the tubing can be pulled after packing and having a screen or perforated liner attached to it at the end is run and the screen or liner is positioned opposite the lower set of perforations. Then a packer is set between the two sets of perforations. Gravel packing fluid containing the particulate agent is pumped down the annulus between the casing and the tubing out of the upper set of perforations, through the previously formed cavity outside the casing opposite the perforations then back through the lower set of perforations and finally through the screen. The particulate agent is filtered out against the lower set of perforations and against the formation face from the portion of the slurry which is simultaneously forced into the formation.

In yet another method for forming a pack which is especially useful in connection with the production of heavy hydrocarbons from, for example, tar sands in which a heavy oil or tar is the matrix and sand or other solids are suspended in the oil, the casing is set through the production zone and perforated at the top of and at the bottom following which tubing is run into the casing to a depth so that a packer may be set between the sets of perforation and the tail pipe extended below the lowest perforations. After the packer is set steam or hot water is forced down the casing, out of the upper perforations, back through the lower perforations and finally out of the tubing. Circulation is continued until a cavity of the desired size is washed or melted out of the formation. In the next step the tubing and packer is pulled and tubing equipped with a back-off connection so that the tubing can be pulled after packing and having a packed off screen at the end thereof is run and set with the screen opposite the lower perforations and a packer between the two sets of perforations. The gravel packing fluid then is pumped down the annulus between the casing and tubing, out through the upper casing perforations and then back through the lower casing perforations and against the screen wall which filters out the particulate material while the carrying fluid passes through the screen and flows back to the surface via the tubing string. As the particulate material is filtered out, it gradually builds up in the cavity previously formed and when the amount of filtered out material is sufficient to cover the lower perforations the introduction of the slurry is stopped. Simultaneously during the injection phase, the slurry is forced out into the formation and particulate material thus is filtered out against the formation face and also contributes to the filling of the previously formed cavity.

The following examples are provided to illustrate the novel stability and utility of the gravel packing fluid of the present invention, and the invention is not to be considered as limited thereto.

EXAMPLE I

To illustrate the stability of the gravel packing fluid of the present invention in comparison to a conventional guar-containing fluid, and one prepared from carboxymethylhydroxyethylcellulose, when the fluid is undergoing shear, the following tests were performed.

A base gel is prepared by admixing a quantity of the gelling agent in tap water. The particular concentration of the gelling agent employed in each test is set forth in the following Tables. Buffers, when present, were also admixed with the base gel. The buffer and its concentration is set forth in the following tables. The gelling agent was permitted to hydrate for 4 hours. A 250 ml sample of the base gel then is placed in a Waring Blender and mixed at the maximum speed which could be obtained without resulting in significant air entrainment. The crosslinking agent then was admixed with the base gel in the quantity indicated in the following tables. A quantity of the sample then was introduced into a Model 39 Fann viscometer. The viscometer was fitted with a #2 bob and #1 spring. The sample was heated in the viscometer from about ambient temperature to about 150° F. Viscosity sweeps were made at 300, 250, 200, 150, 100 and 50 rpm initially and at the temperatures indicated in the tables. The sample was sheared at 100 rpm during the intervals between the viscosity sweeps. The apparent viscosity of the fluid then was calculated from the viscosity sweep data.

The calculated apparent viscosities at 170 sec$^{-1}$ are set forth in the following tables.

TABLE 1

Gelling agent concentration: 40 lbs/1000 gal. water
Crosslinking agent: Zirconium lactate, 40 ppm Zr
Buffer: Fumaric acid, 1 lb/1000 gal water
Buffer: Disodium octaborate tetrahydrate, 10 lbs/1000 gal water

| Temperature (°F.) | Total Time of Test (Min) | Apparent Viscosity at 170 sec$^{-1}$ (cp) |
|---|---|---|
| 80 | 5 | 1064 |
| 100 | 15 | 629 |
| 120 | 30 | 555 |
| 130 | 45 | 443 |
| 150 | 60 | 351 |
| 150 | 75 | 361 |
| 150 | 90 | 390 |

TABLE 2

Gelling agent and concentration:
hydroxypropylguar, 40 lbs/1000 gal. water
Crosslinking Agent: Potassium pyroantimonate ($K_2H_2Sb_2O_7$) 200 ppm Sb:
Buffer: Sulfonic acid, 5 lbs/1000 gal water

| Temperature (°F.) | Total Time of Test (Min)[1] | Apparent Viscosity at 170 sec$^{-1}$ (cp) |
|---|---|---|
| 80 | 10 | 376 |
| 100 | 25 | 35 |

[1]Test terminated after 25 minutes because of decline in fluid viscosity to below usable levels for gravel transport.

TABLE 3

Gelling agent and concentration:
carboxymethylhydroxyethylcellulose, 40 lbs/1000 gal. water
Crosslinking Agent: Aluminum chloride hexahydrate, 13.5 ppm Al
Buffer: Sodium diacetate, 7.5 lbs/1000 gal.

| Temperature (°F.) | Total Time of Test (Min)[1] | Apparent Viscosity at 170 sec$^{-1}$ (cp) |
|---|---|---|
| 80 | 1 | 942 |
| 100 | 15 | 315 |
| 120 | 30 | 53 |

[1]Test terminated after 30 minutes because of decline in fluid viscosity to below usable levels for gravel transport.

The data set forth above clearly illustrates the superior performance of the gravel packing fluid of the present invention.

EXAMPLE II

To further illustrate the stability of the fluid of the present invention, the following test was performed.

A base gel was prepared by admixing a quantity of the designated gelling agent with water in an amount equivalent to the designated concentration per 1000 gallons of aqueous liquid. The gelling agent was permitted to hydrate for 4 hours. A 250 ml sample of the base gel then is placed in a Waring Blender and mixed at the maximum speed which could be obtained without resulting in significant air entrainment. A quantity of 10 to 20 mesh sand was admixed with the gel in an amount equivalent to 1.5 lbs/gal of aqueous liquid together with a quantity of the designated crosslinking agent. Mixing of the sample was continued for 5 minutes after addition of the crosslinking agent. A 100 ml quantity of the sheared sample then was introduced into a graduated cylinder to determine the sand fall out rate. The height to which the sand accumulates in the bottom of the cylinder was measured at regular time intervals. The percent fall out then was calculated. The results are set forth in Table IV, below.

TABLE IV

| Gelling Agent | Gelling Agent Concentration (lbs/1000 gal) | Cross-linking Agent | Crosslinking Agent Concentration (ppm metal ion) | Time to fall out (min) 50% | 100% |
|---|---|---|---|---|---|
| Hydroxyethyl cellulose | 80 | None | — | 2 | 10 |
| Hydroxypropyl guar | 40 | Potassium pyroantimonate | 200 | 7 | 40 |
| Carboxymethylhydroxyethylcellulose | 40 | Aluminum chloride hexahydrate | 13.5 | >24 hrs. | >24 hrs. |
| Derivatized hydroxyethylcellulose of the present invention | 40 | zirconium lactate | 40 | >24 hrs. | >24 hrs. |

The results of the tests clearly illustrate the stability of the gravel packing fluid of the present invention.

EXAMPLE III

To illustrate the controlled breaking capability of the gravel packing fluid of the present invention, the following test was performed.

A base gel was prepared by admixing a quantity of the gelling agent of the present invention in an amount equivalent to 40 lbs per 1000 gallons of aqueous liquid with water. The gelling agent was permitted to hydrate for approximately four hours. Samples of the base gel then were admixed with a quantity of a zirconium lactate crosslinking agent in an amount sufficient to provide a zirconium ion concentration of 40 ppm, a quantity of 10–20 mesh sand equivalent to about 1.5 lbs per gallon of liquid and a breaker comprising sodium persulfate in the quantities set forth in the following Table V. The samples then were placed in a water bath and heated to about 150° F. over a period of about 60 minutes. The fall rate of the sand particles was observed and recorded at regular intervals. The gel was considered to break when the fall rate of the sand particles was equivalent to that of water in a side-by-side comparison.

TABLE V

| Quantity of Breaker (lbs/1000 gal aqueous liquid) | Time to Break (min) |
|---|---|
| 0.05 | 400 |
| 0.10 | 270 |
| 0.15 | 250 |
| 0.20 | 240 |
| 0.25 | 120 |
| 0.50 | 100 |
| 0.75 | 80 |
| 1.00 | 60 |

The results clearly illustrate the ability of the method of the present invention to provide controlled breaking of the gel to facilitate fluid recovery after placement of the gravel pack.

While particular embodiments of the invention have been described, it is to be understood that such descriptions are presented for purposes of illustration only and that the invention is not limited thereto and that reasonable variations and modifications, which will be apparent to those skilled in the art, can be made without departing from the spirit or scope of the invention.

What is claimed is:

1. A method for gravel packing a highly deviated well bore penetrating a subterranean formation comprising:
   preparing a gravel packing fluid by admixing an aqueous liquid, a gelling agent comprising a cellulose ether which is chemically modified to incorporate pendent vicinal dihydroxy groups in an amount sufficient to provide a DS of about 0.3 to about 1.3 and exhibits shear-thermal stability at a temperature in excess of 200° F., said gelling agent being present in an amount in excess of about 0.2 percent by weight of said aqueous liquid, a crosslinking agent comprising a zirconium IV-containing compound present in an amount of at least about 0.001 percent by weight of said aqueous liquid and a particulate agent;
   introducing said gravel packing fluid into a subterranean formation through said highly deviated well bore; and
   depositing said particulate agent within said well bore to form a permeable pack.

2. The method of claim 1 wherein said crosslinking agent comprises at least one member selected from the group consisting of zirconium acetylacetonate, zirconium lactate, zirconium carbonate and zirconium diisopropylamine lactate.

3. The method of claim 1 wherein said cellulose ether is hydroxyethylcellulose.

4. The method of claim 1 wherein the DS is in the range of about 0.7 to about 0.9.

5. The method of claim 1 wherein said gravel packing fluid includes a breaker present in an amount of from about 0.1 to about 2 pounds per 1000 gallons of aqueous liquid.

6. The method of claim 1 wherein said particulate is present in an amount of from about 1 to about 20 pounds per gallon of aqueous liquid.

7. A method for gravel packing a subterranean formation penetrated by a well bore comprising:
   preparing a gravel packing fluid by admixing an aqueous liquid, a gelling agent comprising a cellulose ether which is chemically modified to incorporate pendent vicinal dihydroxy groups in an amount sufficient to provide a DS of about 0.3 to about 1.3 and exhibits shear-thermal stability at a temperature in excess of 200° F., said gelling agent being present in an amount in excess of about 0.2 percent by weight of said aqueous liquid, a crosslinking agent comprising a compound containing soluble zirconium IV ions present in an amount of at least about 0.001 percent by weight of said aqueous liquid and a particulate agent, said gelling agent being prepared by charging said cellulose ether to a diluent system including water in an amount sufficient to swell said cellulose ether to provide a slurry in an enclosed reaction vessel, adding an alkaline material in an amount sufficient to catalyze the reaction of said cellulose ether, with a reactant capable of incorporating into said cellulose ether a pendent vicinal dihydroxy structure, adding said reactant over a predetermined period of time in an amount sufficient to react with and incorporate in said cellulose ether said degree of substitution of pendent vicinal dihydroxy structure, maintaining the temperature of said slurry of cellulose ether and said reactant at a temperature in the range of from about ambient to about the reflux temperature of the diluent system during said reaction, adding acid in an amount sufficient to neutralize the modified cellulose ether to form a water soluble cellulose ether product comprising said gelling agent;

introducing said gravel packing fluid into a subterranean formation through said highly deviated well bore; and depositing said particulate agent within said well bore to form a permeable pack.

8. The method of claim 7 wherein said crosslinking agent comprises at least one member selected from the group consisting of zirconium acetylacetonate, zirconium lactate, zirconium carbonate and zirconium diisopropylamine lactate.

9. The method of claim 7 wherein said cellulose ether is hydroxyethylcellulose.

10. The method of claim 7 wherein the DS is in the range of about 0.7 to about 0.9.

11. The method of claim 7 wherein said gelling agent is present in an amount of from about 0.2 to about 3.0 percent by weight of said aqueous fluid.

12. The method of claim 7 wherein said gravel packing fluid is defined further to contain a breaker.

13. The method of claim 12 wherein said breaker comprises at least one member selected from the group of sodium persulfate, ammonium persulfate, potassium permanganate and enzymes.

14. The method of claim 7 wherein said particulate is present in an amount of from about 1 to about 20 pounds per gallon of aqueous liquid.

15. A method for gravel packing a highly deviated well bore penetrating a subterranean formation comprising:

preparing a gelled gravel packing fluid by admixing an aqueous liquid, a gelling agent comprising a cellulose ether which is chemically modified to incorporate pendent vicinal dihydroxy groups in an amount sufficient to provide a DS of about 0.3 to about 1.3 and exhibits shear-thermal stability at a temperature in excess of 200° F., said gelling agent being present in an amount in excess of about 0.2 percent by weight of said aqueous liquid, a crosslinking agent comprising a zirconium IV-containing compound present in an amount of at least about 0.001 percent by weight of said aqueous liquid, a breaker present in an amount of at least about 0.1 pound per 1000 gallons of aqueous liquid and a particulate agent;

introducing said gravel packing fluid into a subterranean formation through said highly deviated well bore;

depositing said particulate agent within said well bore to form a permeable pack, breaking said gelled fluid to a viscosity similar to that of water; and, applying pressure through said broken fluid to said deposited particulate agent to compact said permeable pack to minimize void spaces therein.

16. The method of claim 15 wherein said crosslinking agent comprises at least one member selected from the group consisting of zirconium acetylacetonate, zirconium lactate, zirconium carbonate and zirconium diisopropylamine lactate.

17. The method of claim 15 wherein said cellulose ether is hydroxyethylcellulose.

18. The method of claim 15 wherein the DS is in the range of about 0.7 to about 0.9.

19. The method of claim 15 wherein said particulate is present in an amount of from about 1 to about 20 pounds per gallon of aqueous liquid.

20. The method of claim 15 wherein said breaker comprises at least one member selected from the group of sodium persulfate, ammonium persulfate, potassium permanganate and enzymes.

* * * * *